United States Patent [19]

Duenas

[11] Patent Number: 4,781,507

[45] Date of Patent: Nov. 1, 1988

[54] QUICK ACTING THREADED FASTENER ASSEMBLY

[76] Inventor: Oswaldo A. Duenas, 13711 Olympic Ave., Costa Mesa, Calif. 92626

[21] Appl. No.: 85,460

[22] Filed: Aug. 13, 1987

[51] Int. Cl.[4] ............................................ F16B 37/08
[52] U.S. Cl. .................................. 411/433; 411/432; 411/437; 269/185
[58] Field of Search ...................... 411/433, 432, 437; 269/184, 185, 186

[56] References Cited

U.S. PATENT DOCUMENTS

| | | | |
|---|---|---|---|
| 446,078 | 2/1891 | Rouse | 269/186 |
| 804,831 | 11/1905 | Cunnius | 269/184 |
| 1,096,763 | 5/1914 | Smith | 411/437 X |
| 1,390,904 | 9/1921 | Hazelton | 411/437 X |
| 2,138,245 | 11/1938 | Smith | 269/185 |
| 2,257,327 | 9/1941 | Bradford | 411/433 |
| 2,420,733 | 5/1947 | Cannova | 24/221 |
| 2,517,364 | 8/1950 | Torreson | 85/1 |
| 2,784,637 | 3/1957 | Smisko | 85/32 |
| 2,828,662 | 4/1958 | Antal | 85/32 |
| 2,840,404 | 6/1958 | Weber, Jr. | 411/433 X |
| 3,006,003 | 10/1961 | Johnson | 10/86 |
| 3,346,279 | 10/1967 | Stachiw et al. | 285/353 |
| 3,710,641 | 1/1973 | Anderson | 269/185 X |
| 4,418,583 | 12/1983 | Taig | 74/501.5 R |

FOREIGN PATENT DOCUMENTS 555656 7/1923 France ........................ 411/437

OTHER PUBLICATIONS

Catalog, The Warren Group—p. 16; Catalog of vises, C-clamps, hammers and similar tools.

Primary Examiner—Lloyd A. Gall
Assistant Examiner—Curtis B. Brueske
Attorney, Agent, or Firm—William J. Kearns

[57] ABSTRACT

A quick acting threaded fastener assembly using two identical half nuts with alternating internal threaded and grooved portions which are either threadedly engaged or slidably aligned with a threaded rod which has corresponding alternating external threaded and landed portions. The screw and nut combination provides quick release and tightening features which facilitate opening and closing clamping jaws or pads on vises, clamps, adjustable wrenches and other devices otherwise requiring many turns of long screws.

4 Claims, 2 Drawing Sheets

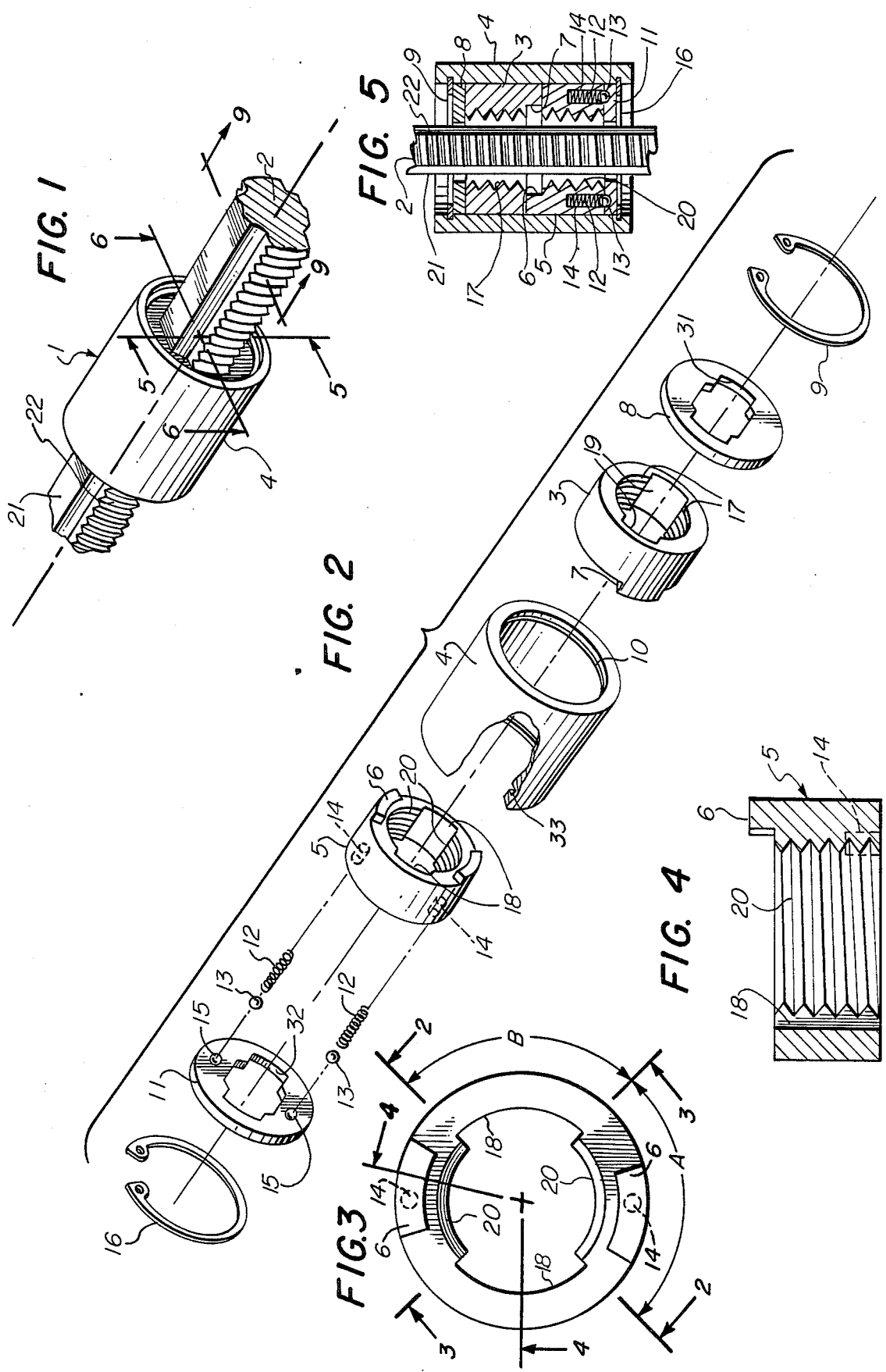

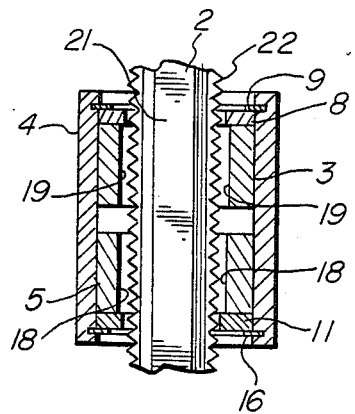
FIG. 6a
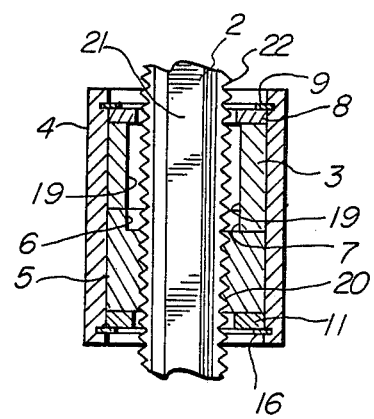
FIG. 6b
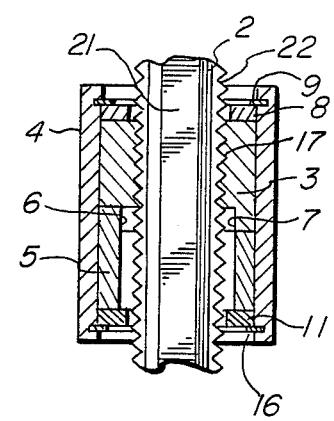
FIG. 6c
FIG. 7
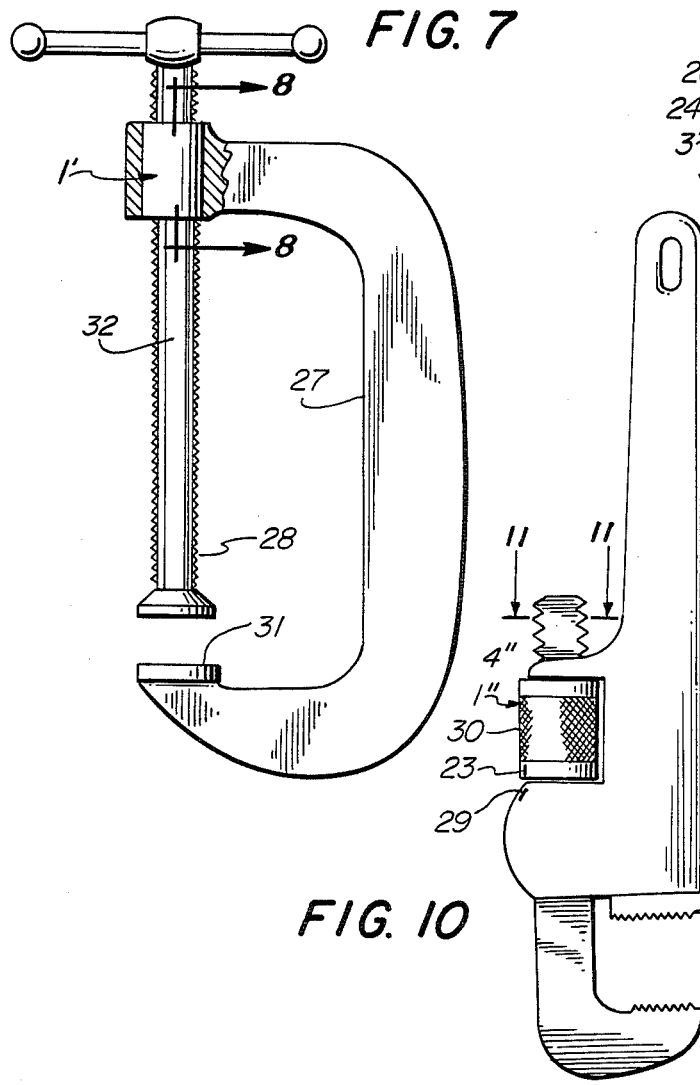
FIG. 8
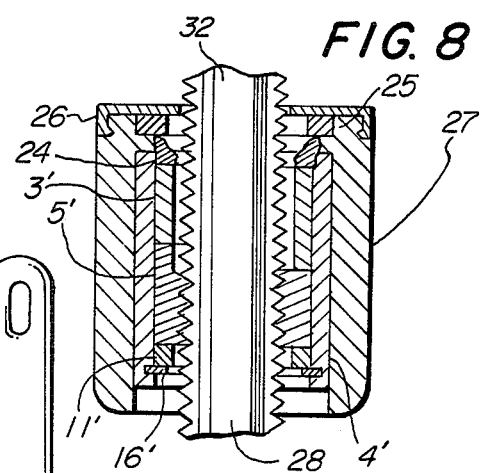
FIG. 9
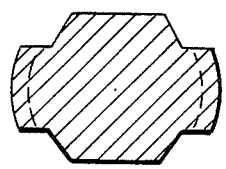
FIG. 10
FIG. 11
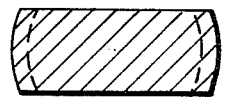

QUICK ACTING THREADED FASTENER ASSEMBLY

This invention relates to screw tightening devices such as C-clamps, adjustable wrenches, vises, glueing clamps and other clamping tools which have long threaded elements for securing work in their jaws, or for adjustment means such as found on drill press depth gauges. In particular it relates to a design of a screw and nut combination which provides for quick release and tightening features to facilitate opening and closing the jaws or clamping pads of the devices.

BACKGROUND OF THE INVENTION

When clamping work pieces by means of vises or clamps it is very often time consuming or inconvenient to open and close jaws using standard screw and nut tighteners because of the large number of turns required to move the jaws large distances. For example clamping a board in a wood working vise, first in a two inch width and then in a ten inch width, sequentially and repeatedly as is done often in finishing operations, extends the time required for the job and contributes to operator fatigue. It would therefore be desirable to be able to position the jaws quickly in either a narrow or wide opening by merely sliding the jaws to the desired position and tightening with only a few turns. This has been done in the case of the woodworking vise, wherein a longitudinally split nut can be disengaged by rotating to the left a turn, sliding the vise jaws to a desired position, re-engaging the jaws with a rotation of the screw to the right, and then tightening the work in place. This particular type of wood working vise has been in reliable use for many years but has a drawback that prevents its application to other than operation in the horizontal plane; the longitudinal split nut relies on gravity to open the nut for sliding the jaws into position before tightening. Another example of a quick disconnect threaded fastener is found in U.S. Pat. No. 2,828,662 wherein the concept of segmented threaded fasteners has been applied to individual nut and bolt assemblies as well as to C-clamps and other fastener applications. While the mechanism of said patent will work in any position, it appears to be somewhat complex and to be limited in thread engagement area. The present invention will be shown to provide some advantages over the state of the art.

SUMMARY OF THE INVENTION

A quick acting threaded fastener assembly comprising a quick acting nut and threaded rod with matching cross-section has been invented for application to tools and other fastening devices requiring a minimum number of turns of the device to effect closing or opening. Fasteners of this type which have been made up till now may be position sensitive, of large size, structurally complicated, or have substantially less than the theoretically achievable degree of threaded engagement of 50 percent between the fixed and rotating elements of the assembly.

It is therefore an object of this invention to provide an efficient, small sized, quick acting threaded fastener which will work in any position, yet provide high strength holding capability by approaching the maximum possible threaded engagement area between the threaded rod and the quick acting drive nut.

It is a further object of this invention to provide a threaded fastener with very few parts so as to be economical to manufacture.

Many applications will become apparent from the following description as detailed in the specification and drawings.

BRIEF DESCRIPTION OF THE DRAWINGS

FIG. 1 shows the quick acting threaded fastener assembly.

FIG. 2 is an exploded view of the quick acting drive nut portion of the said assembly with the component parts aligned as in the disengaged or neutral position.

FIG. 3 is a top view of one of the internally threaded components of FIG. 2 designated herein as a half-nut.

FIG. 4 is a cross-sectional view of the half-nut along line 4—4 of FIG. 3.

FIG. 5 is a cross-sectional view of the quick acting threaded fastener assembly in the disengaged position taken along line 5—5 of FIG. 1 showing also the detent mechanism.

FIG. 6a is a cross-sectional view of the quick acting threaded fastener assembly in the disengaged or neutral position along line 6—6 of FIG. 1.

FIG. 6b is a cross-sectional view of the quick acting threaded fastener assembly in the engaged or drive position along line 6—6 of FIG. 1 showing one of the half-nuts in full engagement with the threaded rod of the assembly.

FIG. 6c is a cross-sectional view as in FIG. 6b showing the quick acting threaded fastener assembly in the engaged or drive position taken along line 6—6 of FIG. 1 but with the drive nut rotated an additional ninety degrees clockwise and showing the other half-nut in full engagement with the threaded rod of the assembly.

FIG. 7 illustrates the application of the quick acting threaded fastener assembly to a C-clamp.

FIG. 8 is an enlarged cross-sectional view of the quick acting threaded fastener along the line 8—8 of FIG. 7.

FIG. 9 shows the cross-section of threaded rod along the line 9—9 of FIG. 1.

FIG. 10 illustrates the application of the quick acting threaded fastener to a pipe wrench.

FIG. 11 shows the cross-section of the threaded rod of FIG. 1 as modified for use on a pipe wrench, taken along line 11—11 of FIG. 10.

DESCRIPTION OF THE PREFERRED EMBODIMENT

Referring now to the drawings, FIG. 1 shows the preferred embodiment of the quick acting nut designated generally by 1 in operating position on threaded rod 2. FIG. 2 displays an exploded view of said quick acting nut wherein the cooperating parts are as follows. Half-nut 3 is secured to housing 4 by an interference or force fit, shrink fit, epoxy or other non-mechanical bonding, welding, threading or other means known to those skilled in the art. Half-nut 5 is rotatably contained in housing 4: stops 6 on half-nut 5 intermesh with similar stops 7 on half-nut 3. Guide plate 8 rotatably abuts half-nut 3 and is held in place by retaining ring 9 which fits into groove 10 of housing 4. Similarly, guide plate 11 rotatably abuts half-nut 5 against which it can be indexed by detent springs 12 and detent balls 13 which are held in the wall of half-nut 5 by holes 14, said balls nesting into holes or depressions 15 located in guide plate 11. Retaining ring 16, fitting into groove 33 in housing 4, holds guide plate 11 in place, thus holding all the cooperating parts at proper axial spacings within housing 4. Half-nuts 3 and 5 have identical external dimensions, including stops 6 and 7; internally there are holes 14 for detent means such as springs 12 and balls 13 in half-nut 5. FIGS. 3 and 4 show the relative positions of the stops 6, threaded sections 20 and slots 18 as located in or on half-nut 5 for the preferred embodiment.

The operation of the quick acting nut 1 can be understood by referring to FIGS. 5 thru 6c. When housing 4 is rotated counterclockwise as in loosening a right handed thread, half-nut 3, being securely attached to housing 4, also rotates in the same direction. Stops 7 on half-nut 3, being interposed between corresponding stops 6 on half-nut 5, engage stops 6 and cause half-nut 5 also to rotate in the same direction. Note that when stops 6 and 7 are in contact due to the counterclockwise rotation, slots 18 in half-nut 5 are aligned with slots 19 in half-nut 3. As housing 4 and half-nuts 3 and 5 rotate counterclockwise, they come into alignment with guide plates 8 and 11. The alignment becomes apparent when detent balls 13 engage depressions 15 in guide plate 11, the engagement being apparent to the operator by the sound and feel of the balls 13 dropping into depressions 15. Thus, slots 18 and 19 in half-nuts 3 and 5 are opposite the threaded portions 22 of threaded rod 2 as can be seen in FIG. 6a, and the threaded portions 17 and 20 of half-nuts 3 and 5 are opposite the unthreaded lands 21 on threaded rod 2 as can be seen in FIG. 5. When the alignment of cooperating parts is accomplished, quick acting nut 1 and threaded rod 2 can slide freely with respect to one another and long traverses of threaded rod 2 can be made quickly without tedious turning action.

Slot 31 in guide plate 8 and slot 32 in guide plate 11 conform slidably to the cross section of threaded rod 2, and serve to minimize angular misalignment and wobble of quick acting nut 1 with respect to the axis of threaded rod 2. Once the desired axial position of quick acting nut 1 has been set, turning the nut clockwise with respect to threaded rod 2 will cause the stops 7 on half-nut 3 to engage stops 6 of half-nut 5 in the reverse direction. When engagement of the stops in the clockwise direction occurs, threaded sections 17 of half-nut 3 are displaced ninety degrees from threaded sections 20 of half-nut 5. This ninety degree displacement can be seen with reference to FIG. 6b which shows threaded lands 22 of threaded rod 2 in slots 19 of half-nut 3 and threaded lands 22 in full threaded engagement with threaded sections 20 of half-nut 5. As further clockwise rotation continues, half-nut 3 begins to engage threaded lands 22 and half-nut 5 becomes proportionately less engaged with threaded lands 22 until half-nut 3 becomes fully threadedly engaged with threaded lands 22 and half-nut 5 becomes fully disengaged from threaded lands 22, as can be seen in FIG. 6c. Because of the ninety degree displacement of threaded sections 17 and 20 of said half-nuts, there is always threaded engagement equivalent to complete engagement of one half-nut at all rotative positions of the quick acting drive nut 1 of the threaded fastener assembly. This is because clockwise rotation between the fully engaged condition of half-nut 3 and half-nut 5 distributes the threaded engagement of threaded rod 2 with said half-nuts in direct proportion to the amount of relative rotation between quick acting nut 1 and threaded rod 2. The result is that, in the engaged or drive position, the total amount of threaded engagement between quick acting nut 1 and threaded rod 2 is constant, thus producing a constant tightening force for all rotative positions of the quick acting nut 1.

The foregoing has shown that this invention utilizes a simple geometric configuration in which threaded sections and clearance slots of the half-nuts intermesh with corresponding threaded lands and unthreaded lands of the threaded rod. As described above, for the invention to work properly there is no requirement that threaded sections of either the half-nuts or the threaded rob subtend the same angle as the unthreaded sections. These subtended angles, shown in FIG. 3 for half-nut 5, as angle A for the threaded sections 20 and angle B for clearance slots 18 are the angles between diametral line 2—2 and diametral line 3—3 which pass through the circumferential limits of each section and slot. Angle A does not necessarily equal B but the sum of angles A and B always equals 180 degrees. For the case of the preferred embodiment as shown in FIG. 3 angles A and B are equal; the advantage of the equal angles is described in the following paragraph. A case wherein the angles A and B are not equal is shown in FIGS. 10 and 11 for the application of the quick acting nut to a wrench as discussed below.

In the case of the preferred embodiment which has four sectors, between the two threaded sections of a half-nut symmetrically opposite each other on a diameter are two clearance slots, thus putting each threaded section and each slotted section in alternate sectors of a circle. These same geometrical considerations apply to the threaded and unthreaded lands on the threaded rod of the quick acting threaded fastener. Any attempt to increase the circumference of a threaded land or section by increasing the angle of its sector beyond ninety degrees decreases correspondingly the room available for an unthreaded land or slot with the net result that the amount of thread engagement will be reduced. The theoretical maximum amount of thread engagement attained when all sectors subtend the same angle is lessened by the amount of angular clearance between sectors which must be put into any practical device; thus the invention is operating at "nearly" the maximum amount of threaded engagement. It is therefore apparent that any even number of sectors may be utilized for a threaded fastener of this type, say six or eight, and, although involving more machine work to fabricate than the preferred embodiment, would not depart from the spirit and intent of this invention.

In the preferred embodiment, in which the number of sectors is four, the positions and shape of the stops 6 and 7 on half-nuts 3 and 5 illustrate the operation of the invention but are quite arbitrary as will be readily appreciated by those skilled in the art. For example, the sector shaped stops could easily be changed to round pins or any alternative shape. All that is necessary for a four sector quick acting nut is for the stops to restrict the relative rotation of said half nuts in either direction to ninety degrees. The alignment of said half-nuts thus has two end positions ninety degrees apart. One position, the disengaged or neutral position produced by counterclockwise rotation, aligns slots 18 in half-nut 5 parallel with slots 19 in half-nut 3 to permit disengagement of both half-nuts from threaded rod 2 as can be seen in the two views in FIGS. 5 and 6a. Clockwise rotation aligns the slots at ninety degrees to each other to produce constant threaded engagement of the half-nuts with threaded rod 2 as shown in FIGS. 6b and 6c. A further constraint on the shape of the stops is placed on the distance the stops may extend axially. In the engaged or drive position each 360 degree rotation of the quick acting nut advances the nut in the tightening direction a distance equal to the pitch of the thread of the nut. Thus a ninety degree rotation of the half-nut displaces the nuts axially one fourth pitch of the screw thread being used. This is in addition to the ninety degree rotation occuring at the initial setting of the half-nut when assembled. If the axial extension of the stops is less than one half of the pitch, the stops may not contact each other due to the relative axial motion between the two half-nuts as the quick acting nut 1 is turned, and the two half-nuts may rotate more than ninety degrees so that they are out of alignment. However, for axial stop lengths longer than one half the pitch, the length is not extremely critical and in the preferred embodiment the axial extension can be between one half and full pitch, the extra length beyond the theoretical minimum of one half pitch being required to overcome tolerances in manufacturing.

Similarly the detent mechanism may be any type of spring loaded indexing means which will serve to indicate when the quick acting nut is in the disengaged or neutral position, and will provide a moderate holding force to half-nut 5 for that position. The peripheral location on guide plate 11 and half-nut 5 of this indexing means may be at any convenient circumferential location as might be arranged by those skilled in the art. Excessive detent force is not needed or even desirable because, in the rotation of the quick acting nut in the tightening direction, the detent mechanism glides over the stationary guide plate and could produce excessive wear of said plate and or said detent mechanism.

A modification of the preferred embodiment which does not digress from the scope of the invention as set forth above is the installation of quick acting drive nut 1' directly into a device by welding or other fastening means in order to be able to supply a very high restoring force in the direction of the weld when unusually high strength is required. This modification is illustrated in the application of the quick acting threaded fastener assembly to a C-clamp as shown in FIG. 7 and FIG. 8. In this application housing 4' and half-nut 3' are welded directly into body 27 of the C-clamp at weld 24; guide plate 25 is held rotatably parallel to the shoulder at weld 24 by cap 26 rather then by a retaining ring. Guide plates 11' and 25 maintain axial alignment of the threaded rod 28 with respect to clamping pad 31 to the same degree of alignment found in conventional C-clamps. The cross section of threaded rod 2 is identical to that of the preferred embodiment as shown in FIG. 9 where the added stiffness imparted to threaded rod 28 by unthreaded lands 32 enhances the column stability of said threaded rod in any application wherein a long length of the rod is operating under compressive forces as in a large C-clamp.

The application of the quick acting fastener assembly to a pipe wrench is shown in FIG. 10. In this application the standard nut on the wrench is replaced by quick acting drivenut 1". Because of space and weight considerations, and because compressive strength is not required, the cross-section of threaded rod 2 is reduced as shown in FIG. 11. Thus, adapting the quick acting nut to the pipe wrench application will require little or no modification of existing wrench design. For the pipe wrench application, knurling 30 is applied to housing 4" for ease of adjustment; fiducial mark 23, which lines up with mark 29 on the pipe wrench body, has been added to facilitate rapid locating of the neutral or disengaged position.

These applications with their minor modifications illustrate the wide applicability of this invention to many uses. Although the invention is ideally suited to screw sizes found in pipe wrenches, C-clamps, wood and metal vises, drill press depth gauges and the like, it can easily be scaled up or down in size and housing shapes without departing from the spirit of the invention as would be apparent to those skilled in the art.

What is claimed is:

1. A quick acting threaded fastener assembly, which is slidably adjustable to a desired tightening position and can be tightened or loosened with a minimum number of turns, comprising:

a quick acting nut;

a threaded rod having one or more threaded lands alternating with a like number of unthreaded lands, said threaded and unthreaded lands subtending substantially equal angles, and said unthreaded lands having all radial dimensions less than one half the minor diameter of the thread of said threaded lands;

a quick acting nut further comprising;

a cylindrical housing;

a first half-nut fixedly held within said housing;

a second half-nut rotatably held within said housing with external dimensions identical to corresponding external dimensions of said first half nut and having an inboard face adjacent the corresponding inboard face on said first half-nut;

said first and second half-nuts being threadedly engagable with said threaded rod and having one or more internally threaded sections alternating with a like number of unthreaded slots, said threaded sections and unthreaded slots subtending substantially equal angles, and said unthreaded slots having radial dimensions greater than one half the major diameter the threads of said threaded rod;

said first half-nut having at least one stop of axial length at least equal to one half the length of the pitch of said threads, said stops projecting from said inboard face toward said corresponding inboard face on said second half-nut and intermeshing with a similar stop projecting therefrom, whereby said stops limit the relative rotary motion of said first half-nut with respect to said second half-nut so that said slots are aligned at one extreme and said threaded sections are aligned for maximum threaded engagement with said threaded rod at the other extreme;

said housing further containing a first guide plate adjacent the outboard face of said first half-nut, said first guide plate being held rotatably parallel to said first half-nut by a first removable retaining means;

said housing further containing a second guide plate adjacent the outboard face of said second half-nut, said second guide plate, identical in external dimensions with said first guide plate and containing at least one detent depression adjacent said outboard face of said second half-nut, being held rotatably parallel to said second half-nut by a second removable retaining means;

said first and second guide plates being disposed in slidable contact with said threaded rod thereby preventing undesirable angular motion between said threaded rod and said quick acting nut, and retained in said housing by said removable retaining means so as to contain all cooperating parts of said quick acting nut at correct axial spacings; and, said second half-nut containing at least one spring actuated detent means in said outboard face cooperating with said detent depressions in said second guide plate, said detent means and said detent depression being indexed so as to indicate a state of slidable alignment of said quick acting nut with said threaded rod when said quick acting nut is rotated in the counterclockwise direction.

2. A quick acting threaded fastener assembly, which is slidably adjustable to a desired tightening position and can be tightened or loosened with a minimum number of turns, comprising:

a quick acting nut;

a threaded rod having two threaded lands alternating with two unthreaded lands, said threaded and unthreaded lands subtending substantially equal angles, and said unthreaded lands having all radial dimensions less than one half the minor diameter of the thread of said threaded lands;

a quick acting nut further comprising;

a cylindrical housing;

a first half-nut fixedly held within said housing;

a second half-nut rotatably held within said housing with external dimensions identical to corresponding external dimensions of said first half nut and having the inboard face adjacent the corresponding inboard face on said first half-nut;

said first and second half-nuts being threadedly engagable with said threaded rod and having two internally threaded sections alternating with two unthreaded slots, said threaded sections and unthreaded slots subtending substantially equal angles, and said unthreaded slots having radial dimensions greater than one half the major diameter of the threads of said threaded rod;

said first half-nut having stops, of axial length at least equal to one half the length of the pitch of said threads, projecting from said inboard face toward said corresponding inboard face on said second half-nut and intermeshing with similar stops projecting from said corresponding inboard face of said second half-nut, whereby said stops limit the relative rotary motion of said first half-nut with respect to said second half-nut to an angle of ninety degrees;

said housing further containing a first guide plate adjacent the outboard face of said first half-nut, said first guide plate being held rotatably parallel to said first half-nut by a first removable retaining means;

said housing further containing a second guide plate adjacent the outboard face of said second half-nut, said second guide plate, identical in external dimensions with said first guide plate and containing two detent depressions adjacent said outboard face of said second half-nut, being held rotatably parallel to said second half-nut by a second removable retaining means;

said first and second guide plates being disposed in slidable contact with said threaded rod thereby preventing undesirable angular motion between said threaded rod and said quick acting nut, and retained in said housing by said removable retaining means so as to contain all cooperating parts of said quick acting nut at correct axial spacings; and, said second half-nut containing two spring actuated detent means in said outboard face cooperating with said detent depressions in said second guide plate, said detent means and said detent depressions being indexed so as to indicate a state of slidable alignment of said quick acting nut with said threaded rod when said quick acting nut is rotated in the counterclockwise direction.

3. A quick acting threaded fastener assembly as in claim 2 wherein said housing contains a fiducial mark on the outer periphery indicating alignment.

4. A quick acting threaded fastener assembly as in claim 3 wherein the outer surface of said housing has a knurled surface.

* * * * *